United States Patent Office 3,466,161
Patented Sept. 9, 1969

3,466,161
GRANULATED POTASSIUM CHLORIDE FERTILIZER
Shmuel Perlmutter, 18 Hapalmach St., Jerusalem, Israel, and Moshe Rudolf Bloch, Asaf Simchoni St., Beersheba, Israel
No Drawing. Filed June 2, 1966, Ser. No. 554,680
Claims priority, application Israel, June 9, 1965, 23,702
Int. Cl. C07c 7/02; C01d 3/04, 3/06
U.S. Cl. 71—33                 6 Claims

ABSTRACT OF THE DISCLOSURE

Granulated potassium chloride for use as a fertilizer is produced by adding to a potassium chloride slurry in any desired sequence the combination of a phosphate reactant which may be phosphoric acid or a water-soluble acidic salt thereof and a magnesium reactant which may be magnesium oxide, magnesium hydroxide or a reaction mixture capable of yielding magnesium hydroxide in situ, thereby to produce a magnesium-phosphorus binder followed by granulating the resultant mixture and drying.

---

The present invention concerns granulated potassium chloride for use as fertilizer.

As is well known chemical fertilizers are best applied in form of granules, preferably of a diameter ranging from about 1 to 4 mm.

Various processes for the granulation of fertilizers are known. They include compressing, spraying and rotary-drying. Compressing and spraying are too exensive operations for an otherwise rather cheap product such as potassium chloride. Rotary-drying is satisfactory from an economic point of view but the product obtained in this way is frequently non-uniform and of inferior quality.

It is the object of the present invention to provide a simple, economic and effective method for the production of granulated potassium chloride.

In accordance with the invention a granulated potassium chloride is produced by a process which comprises adding to wet potassium chloride in any desired sequence on the one hand phosphoric acid or a water soluble acidic salt thereof and on the other hand magnesium oxide or hydroxide or a reaction mixture capable of yielding magnesium hydroxide in situ, thereby to produce in situ a magnesium-phosphorus binder, granulating the resulting mixture of potassium chloride and binder and drying the granulated material at a temperature of 160–230° C.

Preferably the drying temperature is within the range of 190–210° C.

The water content of the potassium chloride used as starting material is preferably within the range of from 12 to 16% by weight. There is no critical value for the relative proportions of the phosphate and magnesium components added to the starting material for the production of the binder. The higher these proportions the harder are the resulting granules. Therefore the relative proportions of the magnesium and phosphate components depend on the desired degree of hardness. A further consideration for increasing the relative proportions of magnesium and phosphate is that the resulting binder upgrades the fertilizing value of the potassium chloride owing to the added magnesium and phosphorus values. At the same time the comparatively high price of the magnesium and phosphorus components must of course be taken into consideration.

It is believed that the binder which accounts for the granular character of the final product is the double salt $KMgPO_4$. In a first stage there presumably forms $KMgPO_4 \cdot 6H_2O$. This hexahydrate is upon heating converted into the monohydrate $KMgPO_4 \cdot H_2O$ and the latter upon further heating above 160° C. is converted into the anhydride $KMgPO_4$. The latter is non-hygroscopic and imparts to the resulting granular potassium chloride a water-repelling character. The phosphate ion is added to the reaction mixture in the form of phosphoric acid or a water soluble acidic salt thereof such as a compound $MH_2PO_4$ where M is an alkali metal or ammonium, or the compound $CaH_4(PO_4)_2$. It is believed that irrespective of the nature of the metal component of the phosphoric acid salt that is used there forms eventually the above-mentioned $KMgPO_4 \cdot 6H_2O$ since this is the less soluble salt.

The process according to the invention may be carried out in various different ways. By one embodiment phosphoric acid or a water soluble acidic salt thereof on the one hand and magnesium oxide or hydroxide on the other hand are added to a potassium chloride slurry and the mixture is filtered, granulated and dried.

By another embodiment only magnesium oxide or hydroxide is added to a potassium chloride slurry, the slurry is filtered and an aqueous solution of phosphoric acid or an acidic salt thereof is spread on the filter residue, either while still on the filter or in the granulating drum.

By yet another embodiment the magnesium hydroxide is produced in situ by the addition of a base such as quick lime, slaked lime, sodium hydroxide, potassium hydroxide or the like to a slurry of potassium chloride in a potassium chloride brine which contains a certain quantity of magnesium chloride. The slurry is then filtered and a cake is obtained which contains potassium chloride and magnesium hydroxide. A solution of phosphoric acid or a water soluble phosphate is then sprayed on this material, either when still on the filter or in the granulating drum.

If desired the drying and granulation may be combined into one operation by using a rotary drying oven that also functions as a granulating drum.

All the embodiments of the process according to the invention may be carried out continuously.

The invention also consists in granulated potassium chloride containing as binder a magnesium-phosphorus compound formed in situ from phosphoric acid or an acidic water soluble salt thereof and magnesium oxide, hydroxide or a mixture capable of yielding in situ magnesium hydroxide.

The invention is illustrated by the following examples without being limited thereto.

EXAMPLE 1

150 grams of technical grade potassium chloride, 3 grams of magnesium oxide, 5 grams of monopotassium dihydrogen phosphate and 1000 cc. of a saturated aqueous KCl solution are mixed together at room temperature in a glass beaker fitted with a stirrer. The reaction mixture is stirred at room temperature for 30 minutes and thereafter the slurry is filtered and the filter cake introduced into a one litre rotating drum and rotated for about 20 minutes. The resulting granular material is removed and dried at 200° C.

The dried granular material contains 95–96% KCl, 1.6–2.3% $P_2O_5$ and 1.0–1.3% MgO. 80% of the material is +20 mesh (USSS).

EXAMPLE 2

150 grams of KCl, 3 grams of MgO and 1000 cc. of a saturated aqueous KCl solution are mixed as described in Example 1, filtered and the filter residue introduced into a granulating drum for 20 minutes. Inside the granulating drum 30 cc. of a saturated mono-potassium dihydrogen phosphate solution is gradually spread on the material. At the end of the operation the granular material is removed from the drum and dried at 200° C. The resulting product has the following sieve analysis (USSS):

| | G. |
|---|---|
| +8 | 21 |
| 8–20 | 100 |
| 20–40 | 10 |
| –40 | 12 |

*Analysis.*—0.87% $P_2O_5$; 1.30% $MgO$.

EXAMPLE 3

150 grams of technical potassium chloride is mixed with 3 grams of magnesium oxide and 1000 cc. of a saturated aqueous KCl solution and the mixture is stirred at room temperature for 30 minutes. Thereafter the mixture is filtered and the filter residue is introduced in a rotating drum for 20 minutes. Inside the drum 30 cc. of a saturated mono-potassium dihydrogen phosphate solution is gradually spread on the material. After 20 minutes the granular material is removed from the drum and dried at 200° C. The sieve analysis is as follows (USSS):

| | Gr. |
|---|---|
| +5 (4.00 mm.) | 32 |
| 5–8 (4.00–2.38 mm.) | 62 |
| 8–12 (2.38–1.68 mm.) | 18 |
| 12–16 (1.68–1.19 mm.) | 5 |
| –16 (smaller than 1.19 mm.) | 14 |

Above 85% of the granular material is of a size +12 mesh (USSS).

EXAMPLE 4

150 grams of granular KCl (–60 mesh, USSS), 50 grams of moist precipitated magnesium hydroxide containing 20% of MgO and 1000 cc. of a saturated aqueous KCl solution containing 10 gr./litre of $MgCl_2$ are mixed at room temperature and stirred for 20 minutes. The slurry is then filtered and the material introduced into a rotating drum. During the rotation of the drum 30 cc. of a $CaH_4(PO_4)_2$ solution, obtained by water extraction of calcium superphosphate, is continually spread on the material. After the completion of the granulation the material is removed and dried at 200° C. The sieve analysis is as follows (USSS):

| | Gr. |
|---|---|
| +8 | 77 |
| 8–20 | 41 |
| 20–40 | 3 |
| –40 | 6 |

The chemical analysis is as follows:

| | Percent |
|---|---|
| KCl | 95.15 |
| HgO | 1.80 |
| CaO | 0.30 |
| $P_2O_5$ | 0.92 |

What we claim is:

1. A process of producing granular potassium chloride which comprises adding to a potassium chloride slurry a phosphate reactant selected from the group consisting of phosphoric acid and water soluble acidic salts thereof and a magnesium reactant selected from the group consisting of magnesium oxide and magnesium hydroxide and a reaction mixture capable of yielding magnesium hydroxide in situ, granulating the resulting mixture and drying the granulated material at a temperature of 160–230° C., thereby to produce in situ a magnesium-phosphorus binder.

2. A process according to claim 1 further comprising the step of filtering said slurry before said granulating step.

3. A process of producing granular potassium chloride which comprises adding to a potassium chloride slurry a magnesium reactant selected from the group consisting of magnesium oxide and magnesium hydroxide and a reaction mixture capable of yielding magnesium hydroxide in situ, filtering said slurry, and spreading an aqueous solution of a phosphate reactant on the filter residue, said phosphate reactant being selected from the group consisting of phosphoric acid and water soluble acidic salts thereof, granulating the resulting mixture and drying the granulated material at a temperature of 160–230° C. to produce in situ a magnesium-phosphorus binder.

4. A process according to claim 3 further comprising the step of introducing said filter residue into a granulating drum before the aqueous solution of a phosphate reactant is spread thereon in said drum.

5. A process of producing granular potassium chloride which comprises adding to a potassium chloride slurry a base in a potassium chloride/magnesium chloride brine to produce magnesium hydroxide in situ, filtering said slurry, and spreading an aqueous solution of a phosphate reactant on the filter residue, said phosphate reactant being selected from the group consisting of phosphoric acid and water soluble acidic salts thereof, granulating the resulting mixture and drying the granulated material at a temperature of 160–230° C. to produce in situ a magnesium-phosphorus binder.

6. Granulated potassium chloride containing as binder a magnesium-phosphorus compound formed by the process of claim 1.

References Cited

UNITED STATES PATENTS

| 2,107,702 | 2/1938 | Haase et al. | 71—61 |
| 3,195,978 | 7/1965 | Dunseth et al. | 23—64 X |
| 3,320,048 | 5/1967 | Legal et al. | 71—64 |

OTHER REFERENCES

Urbain Eduard: Chem. Abstracts, 26, 41279 (1932).

S. LEON BASHORE, Primary Examiner

R. D. BAJEFSKY, Assistant Examiner

U.S. Cl. X.R.

23—89, 313; 71—61, 64